(12) United States Patent
Nishida

(10) Patent No.: US 7,474,831 B2
(45) Date of Patent: Jan. 6, 2009

(54) VIDEO RECORDING AND PLAYING APPARATUS

(75) Inventor: Yusuke Nishida, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 991 days.

(21) Appl. No.: 10/993,489

(22) Filed: Nov. 22, 2004

(65) Prior Publication Data

US 2005/0117892 A1 Jun. 2, 2005

(30) Foreign Application Priority Data

Nov. 27, 2003 (JP) ............................. 2003-397425

(51) Int. Cl.
*H04N 5/91* (2006.01)
*H04N 5/00* (2006.01)

(52) U.S. Cl. ........................................ 386/46; 386/125

(58) Field of Classification Search ....................... None
See application file for complete search history.

(56) References Cited

U.S. PATENT DOCUMENTS 6,614,986 B2 * 9/2003 Tognazzini .................. 386/46
7,286,748 B2 * 10/2007 Srinivasan et al. ............ 386/69
2002/0124099 A1 * 9/2002 Srinivasan et al. .......... 709/231

FOREIGN PATENT DOCUMENTS

JP 2002-354423 A 12/2002
JP 2003-134464 5/2003

* cited by examiner

*Primary Examiner*—John W Miller
*Assistant Examiner*—Heather R Jones
(74) *Attorney, Agent, or Firm*—Global IP Counselors, LLP

(57) ABSTRACT

A video playing and recording apparatus has a time shift function which allows a television program or other such data to be temporarily recorded in a file of a time shift recording region of a hard disk while the recorded data can be played, When a data recording command is received during a time shift function, the temporary recording of data in file A of the time shift recording region is stopped, and the permanent recording in file B of a permanent recording region is started. At this time, the end address of the data in file A is recorded in file B, and the head address of the data in file B is recorded to file A. The data in file A and file B can be played continuously by using the two addresses recorded in file A or file B.

10 Claims, 12 Drawing Sheets

VIDEO RECORDING AND PLAYING APPARATUS

BACKGROUND OF THE INVENTION

1. Field of the Invention

The present invention relates to a video recording and playing apparatus having a time shift function.

2. Background Information

As with a hard disk recorder, a time shift function is provided in some video recording and playing apparatuses that record and play broadcast data including video images such as a television program. The time shift function is a function by which broadcast data that is inputted from an external source is temporarily recorded in a specific recording region of a hard disk up to a predetermined period of time, while allowing certain processes to be performed on the recorded data. For instance, this time shift function allows the data that has been temporarily recorded in the predetermined region of the hard disk to be read and played for up to the above-mentioned predetermined time, and also allows the data being played to be fast-forwarded, rewound, paused, and so forth. The predetermined region of the hard disk where data is recorded by the time shift function (hereinafter referred to as the time shift recording region) is used as a ring buffer. Accordingly, when data corresponding to the predetermined amount of time has been recorded, any subsequent data is recorded over the oldest recorded data in the ring buffer. The purpose of allowing data to be temporarily recorded in the time shift recording region in this manner is to utilize the recording region of the hard disk more effectively.

With an apparatus having the time shift function as described above, when the record button is pressed or when the recording start time of a timer recording function comes, broadcast data is usually permanently recorded in a region (hereinafter referred to as the permanent recording region) separate from the above-mentioned time shift recording region. The reason why the data recording region for permanent recording and the data recording region of time shift recording are separately provided is because the time shift recording region is used as a ring buffer. Therefore, if the data is recorded in this time shift recording region for the purpose of permanent recording, the data will be written over after a while and cannot be stored permanently.

It has been known to permanently record data that has been temporarily recorded during the time shift operation. Such technology by which data is permanently recorded after the data has been temporarily recorded during the time shift operation is disclosed in Japanese Laid-Open Patent Application 2003-134464 and Japanese Laid-Open Patent Application 2002-354423. In Japanese Laid-Open Patent Application 2003-134464, when the record button is pressed during the time shift operation, the recording of data in the time shift recording region is stopped, and the recording of data in the permanent recording region is started. After the recording of data in the permanent recording region ends, the data that was recorded in the time shift recording region between the time at which a time shift function such as playing the data recorded in the time shift region was started and the time when the recording of data in the permanent recording region started is transferred to the permanent recording region. As a result, the data corresponding to this time period is permanently recorded without any omission. Japanese Laid-Open Patent Application 2002-354423 discloses a personal computer hard disk in which the data recording region does not have separate regions for the permanent recording and the time shift recording, and instead the recordings is performed continuously in one region, and when a request for the permanent recording of data is received during a time shift operation, the time shift data that has already been recorded is converted into data for permanent recording, such that the data is permanently recorded.

With a conventional apparatus having a time shift function, when there is a command from the record button or a timer recording function to permanently record data during the playing of the time shift operation, the recording of data in the time shift recording region is stopped and the permanent recording of data in the permanent recording region is started, as in the above-mentioned Japanese Laid-Open Patent Application 2003-134464. The problem, however, is that when the data recording position suddenly jumps from the time shift recording region to the permanent recording region in this way, the data that was recorded in the time shift recording region is cut off at the point where the data recording in the permanent recording region started, and the playing of the data recorded in the time shift recording region is forcibly stopped at this point while playing data in the time shift recording region. Another problem is that, if the data corresponding to the time between the start of the time shift operation and the time when the permanent recording starts is transferred to the permanent recording region, the transferred data can be subsequently played, but it is impossible to access the data recorded prior to the recording of the transferred data. It is also not possible to play data with the time shift operation during the permanent recording. Also, if, as in the computer hard disk of Japanese Laid-Open Patent Application 2002-354423, data is recorded continuously in the same region both during the time shift recording and the permanent recording, the data can be played with the time shift operation even after the permanent recording is started. In a conventional video recording and playing apparatus, however, since data is pre-configured to be recorded in separate regions during time shift recording and during permanent recording, these two types of data cannot be recorded continuously.

In view of the above, it will be apparent to those skilled in the art from this disclosure that there exists a need for an improved video recording and playback apparatus that overcomes the problems of the conventional art. This invention addresses this need in the art as well as other needs, which will become apparent to those skilled in the art from this disclosure.

SUMMARY OF THE INVENTION

It is a purpose of the present invention to provide a video recording and playback apparatus with which the permanent recording of data can be performed while allowing data to be played with a time shift operation.

The present invention provides a video recording and playing apparatus that records and plays video image data inputted from an external source, including an input portion, a recording medium, a command receiving portion, and a controller. The input portion is configured to receive data being inputted. The recording medium has a first recording region, in which the inputted data is configured to be at least partially recorded. The command receiving portion is configured to receive a data recording command. The controller is operatively coupled to the input portion, the recording medium, and the command receiving portion and configured to perform a time shift function, by which the inputted data is recorded in a first file created in the first recording region while allowing the controller to play any portion of the data recorded in the first recording region. When the command receiving portion receives the data recording command, the controller is configured to stop recording data in the first file, record the inputted data in a second file created in a second recording, and record in the recording medium an end address of the first file and a head address of the second file. The controller is further configured to play the data recorded in the first file and the second file continuously by using the end address of the first file and the head address of the second file.

When, as above, the permanent recording of data in the second recording region is started during the time shift function, and the end address of the temporarily recorded data in the first recording region and the head address of the permanently recorded data in the second recording region are recorded in the memory, the temporarily recorded data in the first recording region and the permanently recorded data in the second recording region can be treated as a single set of data. Accordingly, it is possible to prevent the loss of the temporarily recorded data that was recorded before the permanent recording. Thus, the data in the first and second recording regions can be performed continuously even while the permanent recording of data in the second recording region is performed. Upon completion of the playing of the data in the first recording region, the playing of the permanently recorded data in the second recording region can be continuously started using the head address of the permanently recorded data. Specifically, the permanent recording of data can be performed while allowing data in the first recording region to be played. Also, when the data is fast-forwarded, the playing position can be moved from the temporarily recorded data in the first recording region to the permanently recorded data in the second recording region by using the head address of the permanently recorded data. Conversely, when the data is rewound, the playing position can be moved from the permanently recorded data in the second recording region to the temporarily recorded data in the first recording region by using the end address of the temporarily recorded data.

Also, in an embodiment of the present invention, the command receiving portion is configured to receive a data recording stop command. When the controller stops recording data in the second file upon receipt of the data recording stop command by the command receiving portion while performing the time shift function, the controller is configured to resume recording data in a third file created in the first recording region at an address immediately after the end address of the first file, record in the recording medium a head address of the third file, invalidate the head address of the second file, and play the data recorded in the first file and the third file continuously by using the end address of the first file and the head address of the third file.

When, as above, the temporary recording of data in the first recording region is resumed after the permanent recording of data that was started during the time shift operation, the head address of the temporarily recorded data that is recorded after the permanent recording is recorded in the memory, and the head address of the permanently recorded data that has already been recorded is thereby invalidated. Accordingly, the two sets of temporarily recorded data recorded in the first recording region before and after the permanent recording can be treated as a single set of data by using the end address of the temporarily recorded data recorded prior to the permanent recording and the head address of the temporarily recorded data recorded after the permanent recording. Therefore, it is possible to prevent the loss of the temporarily recorded data recorded before the permanent recording. Also, when the temporary recording of data in the first recording region is resumed at an address immediately after the end address of the temporarily recorded data that has been recorded prior to the permanent recording, it is possible to prevent the temporarily recorded data recorded before the permanent recording from being over-written and erased by the data recorded after the permanent recording. Thus, it is possible to continuously play the temporarily recorded data that was recorded before the permanent recording even after the temporary recording of data in the first recording region is started again. Upon completion of the playing of the temporarily data recorded before the permanent recording, the temporarily recorded data recorded after the permanent recording can be continuously played due to the head address of the temporarily recorded data recorded after the permanent recording. Also, when the data is fast-forwarded, the playing position can be moved from the temporarily recorded data recorded before the permanent recording in the first recording region to the temporarily recorded data recorded after the permanent recording by using the head address of the temporarily recorded data recorded after permanent recording. When the data is rewound, the playing position can be moved from the temporarily recorded data recorded after the permanent recording in the first recording region to the temporarily recorded data recorded before the permanent recording by using the end address of the temporarily recorded data recorded before the permanent recording.

Also, in an embodiment of the present invention, the controller records the end address of the first file in the second file and the head address of the second file in the first file when the controller starts recording data in the second file while performing the time shift function. The controller records the end address of the first file in the third file and the head address of the third file in the first file and invalidates the head address of the second file when the controller stops recording data in the second file and starts recording data in the third file.

Also, in an embodiment of the present invention, the controller records the head address of the third file in the second file when the controller stops recording data in the second file and starts recording data in the third file, and the controller plays data in the second file and the third file continuously if the head address of the third file is recorded in both the first and second files.

Also, in another embodiment of the present invention, the command receiving portion is configured to receive a data recording stop command; and when the command receiving portion stops recording data in the second file upon receipt of the data recording stop command while performing the time shift function, the controller is configured to start recording data in a third file created in the first recording region at an address immediately after the end address of the first file, record in the recording medium a head address of the third file and the end address of the second file, and play the data recorded in the first, second, and the third files continuously by using the end address of the first file, the head address of the second file, the end address of the second file, and the head address of the third file.

When, as above, the temporary recording of data in the first recording region is resumed after the permanent recording of data that was started during a time shift, and the end address of the permanently recorded data and the head address of the temporarily recorded data recorded after the permanent recording are recorded in the memory, the temporarily recorded data recorded before the permanent recording, the permanently recorded data, and the temporarily recorded data recorded after the permanent recording can be treated as a single set of data by using the end address of the temporarily recorded data recorded before the permanent recording, the start and end addresses of the permanently recorded data, and the head address of the temporarily recorded data recorded after the permanent recording. Accordingly, it is possible to prevent the loss of the temporarily recorded data recorded before the permanent recording. Also, when the temporary recording of data in the first recording region is resumed at the address immediately after the end address of the temporarily recorded data that had been recorded in the first recording region prior to the permanent recording, it is possible to prevent the temporarily recorded data recorded before the permanent recording from being over-written and erased by the temporarily recorded data recorded after the permanent recording. Thus, playing of the temporarily recorded data recorded before the permanent recording can be performed continuously even after the temporary recording of data is recorded in the first recording region again. Upon completion of the playing of the temporarily recorded data recorded before the permanent recording, the permanently recorded data can be played continuously by using the head address of the permanently recorded data. Also, when the data is fast-forwarded, the playing position can be moved from the temporarily recorded data recorded before the permanent recording to the temporarily recorded data recorded after the permanent recording by using the head address of the permanently recorded data and the head address of the temporarily recorded data recorded after the permanent recording. Also, when the data is rewound, the playing position can be moved from the temporarily recorded data recorded after the permanent recording to the permanently recorded data and to the temporarily recorded data recorded before the permanent recording by using the end address of the permanently recorded data and the end address of the temporarily recorded data recorded before the permanent recording.

Also, in another embodiment of the present invention, controller records the end address of the first file in the second file and the head address of the second file in the first file when the controller starts recording data in the second file while performing the time shift function, and the controller records the end address of the second file in the third file and the head address of the third file in the second file when the controller stops recording data in the second file and starts recording data in the third file.

In a typical example of the present invention, a hard disk is used as the recording medium, a time shift recording region is provided in this hard disk as a first recording region that allows the temporary recording of data up to a predetermined specific amount of time, and a permanent recording region is provided as a second recording region that allows the permanent recording of data. During the time shift operation, when broadcast data inputted from an external source is temporarily recorded in the time shift recording region and a data recording command is received, the broadcast data is permanently recorded in the permanent recording region. In addition to this typical example, broadcast data may be temporarily recorded in the time shift recording region of the hard disk, and when a data recording command is received, the broadcast data may be permanently recorded in a recording region of a disk that can be removed from the video recording and playing apparatus, such as a DVD. However, if time shift data and permanently recorded data are respectively recorded in the time shift recording region and the permanent recording region of the hard disk as in the above typical example, the data recorded in one region an be quickly read out and smoothly played upon conclusion of the playing of data recorded in the other region.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
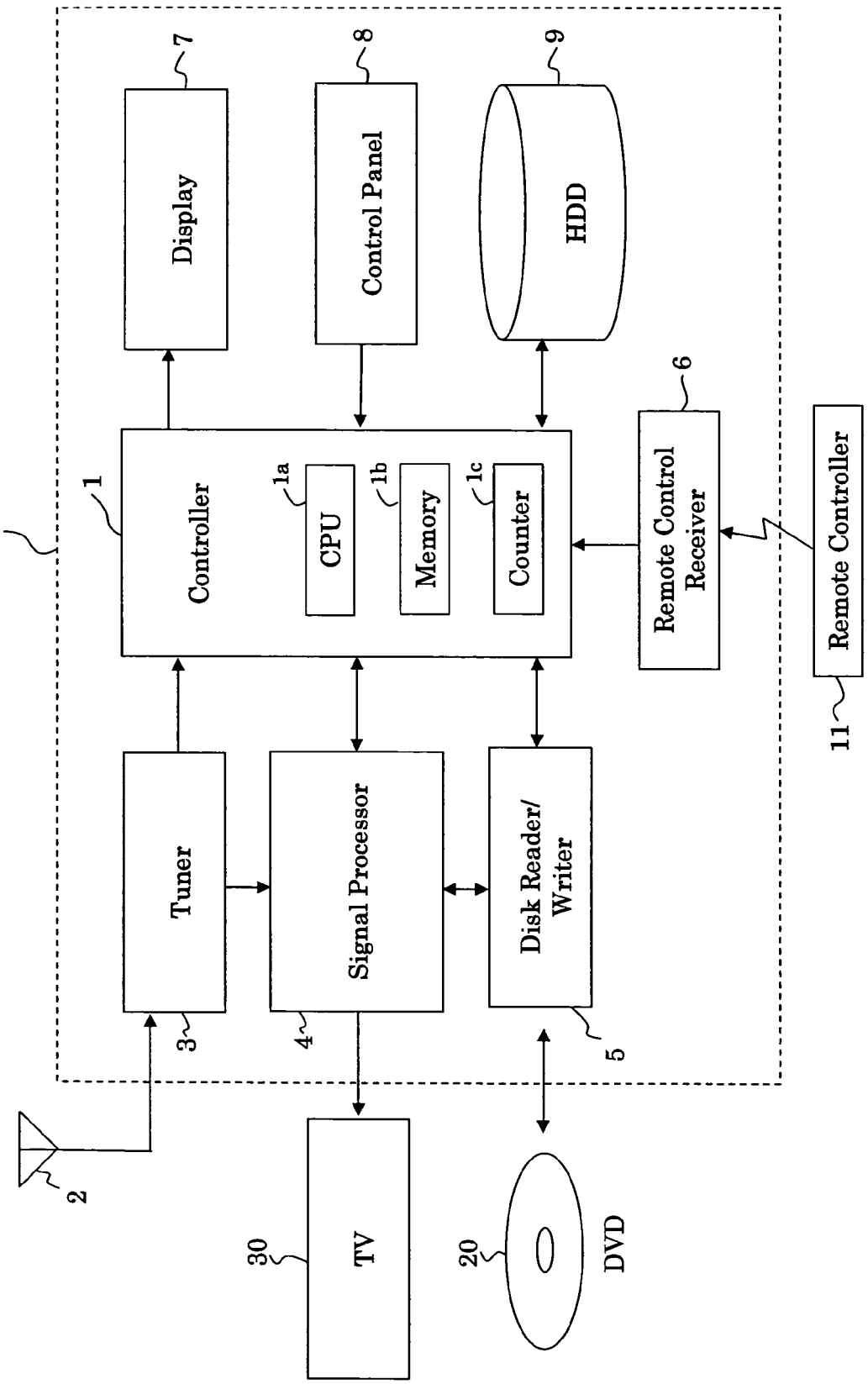
FIG. 1 is a block diagram illustrating the electrical configuration of an HDD/DVD recorder.

FIG. 1 is a block diagram illustrating the electrical configuration of an HDD/DVD recorder as a video recording and playing apparatus in accordance with an embodiment of the present invention. In FIG. 1, the portion enclosed by the broken line is the main part of an HDD/DVD recorder 10. This HDD/DVD recorder 10 has a time shift function by which broadcast data including a video image inputted from an external source is temporarily recorded for up to a predetermined period of time in a predetermined recording region of a hard disk 9 (discussed below), while at the same time allowing various time shift operations to be performed on the recorded data. With the time shift function, the data temporarily recorded in the predetermined recording region of the hard disk 9 can be read and played for up to the predetermined time, and the temporarily recorded data can also be fast-forwarded, rewound, paused, and so forth.

The HDD/DVD recorder 10 includes a controller 1, a tuner 3, a signal processor 4, a disk reader/writer 5, a remote control receiver 6, a display 7, a control panel 8, and a HDD or hard disk 9. The controller 1 is operatively coupled to the tuner 3, the signal processor 4, the disk reader/writer 5, the remote control receiver 6, the display 7, the control panel 8, and the HDD 9 in a conventional manner. The controller 1 selectively controls various components of the HDD/DVD recorder 10, and includes a CPU 1a, a memory 1b such as a RAM or ROM, and a counter 1c that keeps track of the time for operations such as playing and recording. It will be apparent to those skilled in the art from this disclosure that the precise structure and algorithms for controller 1 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The tuner 3 extracts analog signals including video images from the broadcast signal received by an antenna 2, which receives a broadcast signal such as a television program. The signal processor 4 includes a circuit for analog or digital signal processing. This signal processor 4 receives the analog signal inputted from the tuner 3 via the controller 1, and outputs the analog signal to a television receiver (hereinafter referred to as TV) 30, or digitizes the analog signal and then processes the digitized signal into a compressed format such as the MPEG2 (Moving Picture Experts Group Phase 2) format, and outputs the compressed data to the disk reader/writer 5 or the controller 1. The disk reader/writer 5 includes various components such as a pick-up, a pick-up drive circuit, a disk drive circuit. This disk reader/writer 5 records data outputted from the signal processor 4 in a DVD (Digital Versatile Disk) 20, and reads data recorded on the DVD 20 and outputs the data to the signal processor 4. The signal processor 4 plays the data that is recorded on the DVD 20 and outputted from the disk reader/writer 5, converts the data into an analog signal, and then outputs the analog signal to the TV 30. The TV 30 displays a video image on a CRT or other such monitor and outputs sounds through a speaker based on the analog signal outputted from the signal processor 4.

The remote control receiver 6 receives control signals from a remote controller 11. The display 7 is equipped with, for example, an FLD (fluorescent display tube), a LED lamp, or the like for displaying various operating statuses of the HDD/DVD recorder 10. The control panel 8 is equipped with components such as buttons and/or switches, which are preferably provided at the front of the HDD/DVD recorder 10. The remote controller 11 and the control panel 8 are equipped with buttons, for instance, that are to be pressed to invoke operations of the HDD/DVD recorder 10, namely, play, record, fast-forward, rewind, and pause. Also provided are buttons or the like for setting timer recording.

The hard disk 9 has a time shift recording region, which is a ring buffer in this embodiment, in which data can be temporarily recorded up to a predetermined amount of time, and a permanent recording region, in which data can be permanently recorded. The controller 1 activates the above-mentioned time shift function when the power switch of the HDD/DVD recorder 10 is turned on, or a button designated for activation of the time shift function or the like is operated. Once the time shift function is activated, data such as a television program that has been inputted from an external source through the antenna 2 and the tuner 3 and compressed by the signal processor 4 is temporarily recorded in the time shift recording region of the hard disk 9. In the meantime, the user can play the data recorded in the time shift recording region by going back in time, with the signal processor 4 reading and playing this recorded data. The amount of time that the time shift operation can go back is set as desired by the user, such as to 0 minutes, 30 minutes, 1 hour, or 2 hours. For example, if the amount of time to go back is set at 2 hours, the data that was recorded 2 hours prior to the present time is played. Playing data that was previously recorded in this manner is called delayed playing of the time shift operation. Also, if the amount of time to go back is set at 0 minutes, data that is currently inputted and recorded is played simultaneously without delay. Playing data that is currently recorded in this manner is called a live playing procedure of the time shift operation. The data that is being played is processed by the signal processor 4 and then outputted to the TV 30, then displayed as a video image on the monitor of the TV 30 and outputted as sound from the speaker.

Also, if the controller 1 receives a data recording command with a record button provided on the remote control 11 or the control panel 8 being operated or when a preset timer recording start time being reached, data such as a television program that has been inputted from an external source and compressed by the signal processor 4 is permanently recorded and stored in the permanent recording region of the hard disk 9. The controller 1 thus also causes data that has been permanently recorded in the permanent recording region to be read and played by the signal processor 4, as discussed below.

With the above constitution, the controller 1 corresponds to the time shift means, the record control means, and the play control means. The tuner 3 corresponds to the input portion in the present embodiment. Similarly, the hard disk 9 corresponds to the memory or the recording medium, and the remote control receiver 6 and the control panel 8 correspond to the command receiving portion in the present embodiment.

Figure 2:
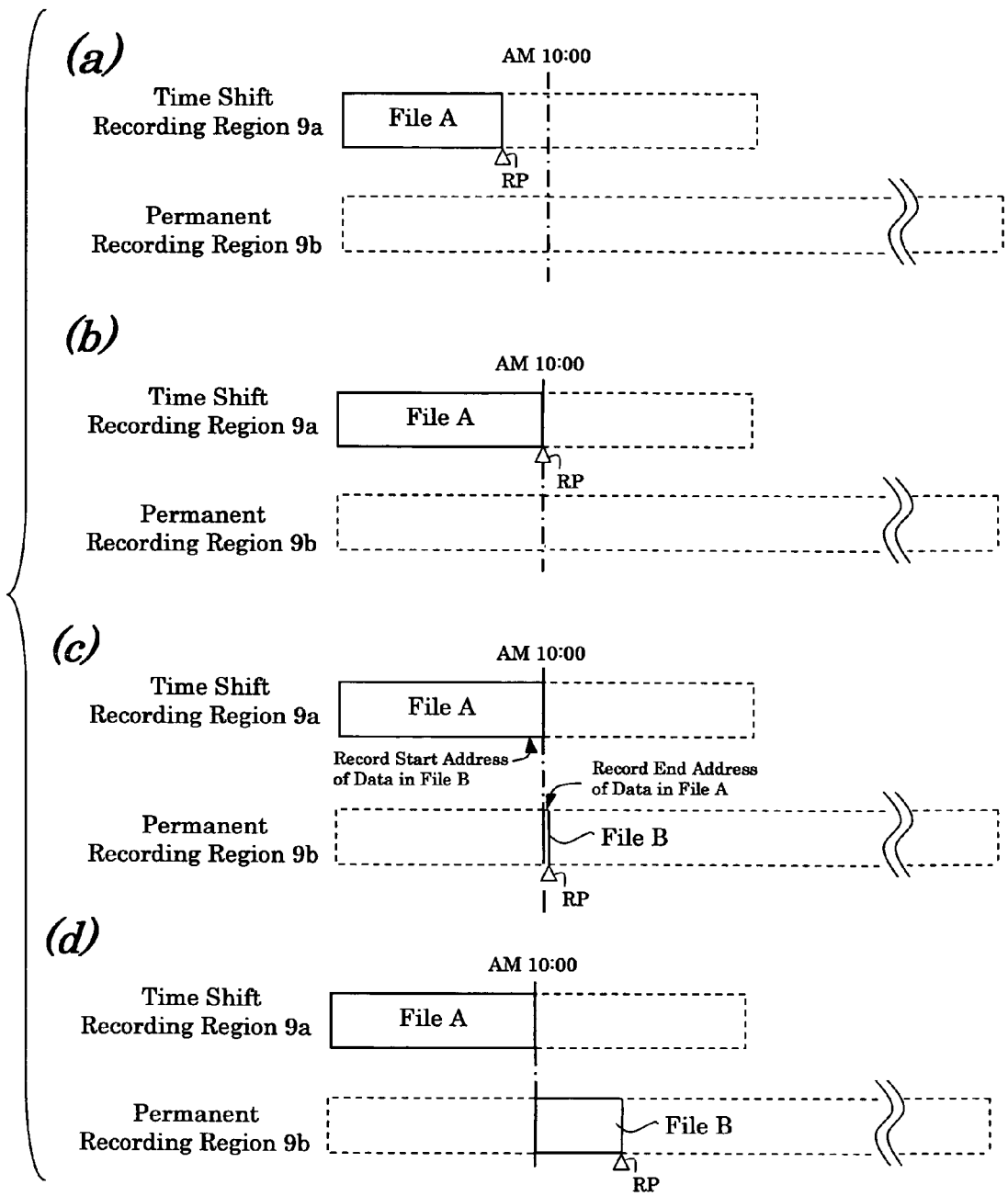
FIG. 2 is a schematic diagram illustrating the data recording procedure of the time shifting operation.
Figure 3:
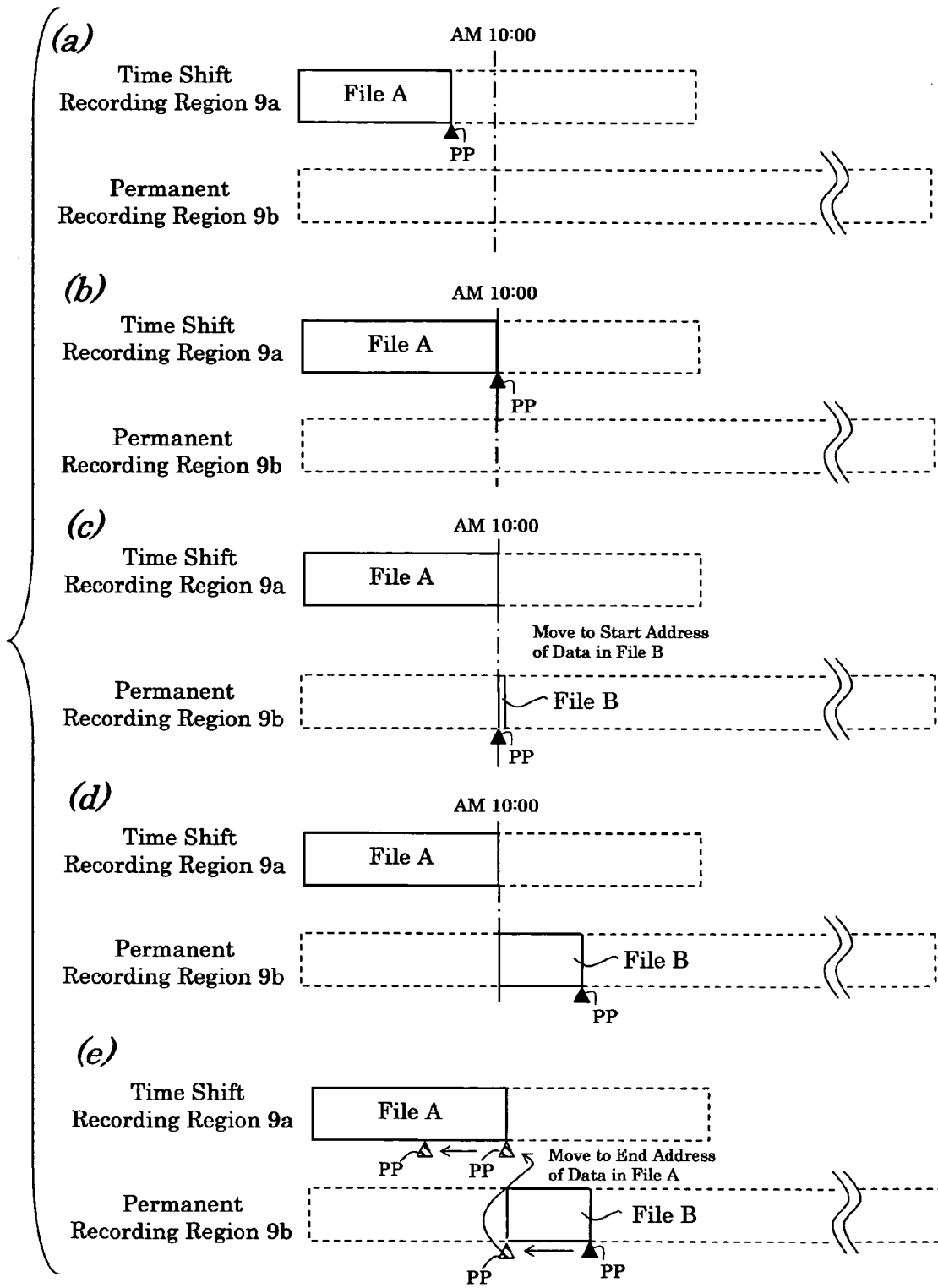
FIG. 3 is a schematic diagram illustrating the live playing procedure of the time shifting operation.
Figure 4:
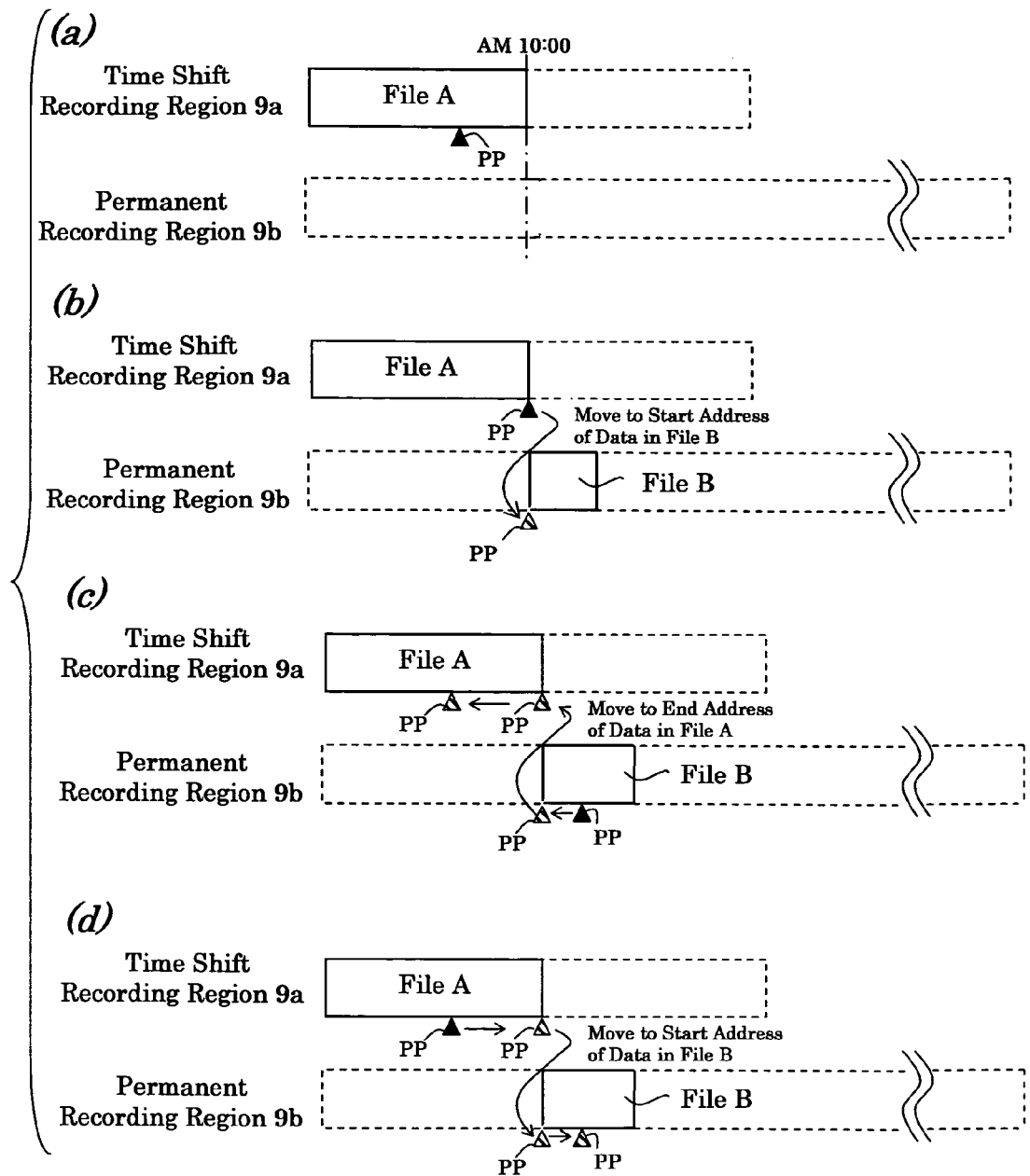
FIG. 4 is a diagram illustrating the delayed playing procedure of the time shifting operation.

FIGS. 2 to 4 are diagrams illustrating the operating procedure of the HDD/DVD recorder 10. FIG. 2 shows the data recording procedure of the time shift operation, while FIG. 3 shows the live playing procedure of the time shift operation.

FIG. 4 shows the delayed playing procedure of the time shift operation. In each Figure, a time shift recording region 9a (an example of the first recording region) and a permanent recording region 9b (an example of the second recording region) are schematically illustrated as the time shift recording region and the permanent recording region that are provided in the above-mentioned hard disk 9. In this example, the maximum data recording time of the time shift recording region 9a is set as 2 hours. The time shift recording region 9a corresponds to both the time shift recording region and the first recording region in the present invention. The permanent recording region 9b corresponds to both the permanent recording region and the second recording region in the present invention. RP in FIG. 2 indicates the data recording position, and PP in FIGS. 3 and 4 indicates the data playing position.

First, in FIG. 2, when the power switch of the HDD/DVD recorder 10 is turned on, for example, and the time shift function is activated, the above-mentioned controller 1 creates a file A (an example of the first file) as a storage region for data such as a television program to be recorded in the time shift recording region 9a of the hard disk 9, and starts the temporary recording of the data in this file A. FIG. 2(a) illustrates a state in which a certain amount of data has been recorded in file A of the time shift recording region 9a. As shown in FIG. 2(b), when a preset timer recording start time of 10:00 a.m. comes and a data recording command is received, the controller 1 stops the temporary recording of data in file A of the time shift recording region 9a, and as shown in FIG. 2(c) creates a file B in the permanent recording region 9b as a region for storing data such as TV programs to be recorded, moves the recording position RP to this file B, and starts permanent recording of the data. At this time, the controller 1 records in file B the end address of the data temporarily recorded in file A, and records in file A the head address of the data that is being permanently recorded in file B. After this, the controller 1 records the data as needed in file B of the permanent recording region 9b as shown in FIG. 2(d). The data recorded in file A and file B may be the same television program or the like, or may be different television programs.

Simultaneously with the above-mentioned recording of the data in the time shift recording region 9a or the permanent recording region 9b, the controller 1 plays the recorded data. With the live playing procedure shown in FIG. 3, the controller 1 plays the data that is currently inputted and temporarily recorded in file A of the time shift recording region 9a, as shown in FIG. 3(a). After this, as shown in FIG. 3(b), when the timer recording start time of 10:00 a.m. comes, the controller 1 starts the permanent recording of data in file B, which is created in the permanent recording region 9b as discussed above. The controller 1 then records in file A the head address of the data being permanently recorded in file B. Therefore, the address of the data can be read from file A, and the playing position PP is moved to the head address of the data in file B as shown in FIG. 3(c). After this movement, the controller 1 immediately starts playing the data that is currently inputted and simultaneously recorded in file B. After this, as shown in FIG. 3(d), if the rewind button on the above-mentioned remote control 11 or the control panel 8 is pressed and a data rewind command is received during the live playing procedure of the data in file B, the controller 1 moves the playing position PP toward the head address of the data in file B, as shown in FIG. 3(e). Once the playing position PP moves to the head address of the data in file B, since the end address of the data that is temporarily recorded in file A of the time shift recording region 9a is recorded in file B, the controller 1 reads this address from file B and moves the playing position PP to the end address of the data in file A (as indicated by the arrow) based on the data rewind command. Then, the playing position PP is further moved toward the head address of the data in file A.

In the above embodiment, the end address of the data in file A is read from file B when the playing position PP is moved to the head address of the data in file B. However, the timing at which the end address of the data in file A should be read is not limited thereto. Alternatively, the end address of the data in file A may also be read, for example, when a data rewind command is received, or when the playing position PP is being moved toward the head address of the data in file B.

Meanwhile, in the delayed playing procedure shown in FIG. 4, the controller 1 plays, out of all the data that was temporarily recorded in file A of the time shift recording region 9a, data that was recorded a predetermined period of time before the current time (10:00 a.m. here) is played, as shown in FIG. 4(a). In this delayed playing procedure, by the time the playing position reaches the end of the data in file A, the permanent recording of the data in file B, which is created in the permanent recording region 9b as discussed above, has already started, and the head address of the data in file B has already been recorded in file A. Thus, as shown in FIG. 4(b), once the playing position PP reaches the end address of the data recorded in file A and the playing of the data recorded in file A is completed, the controller 1 reads from file A the head address of the data in file B and moves the playing position PP to the head address of the data in file B as indicated by the arrow. After this movement, the controller 1 immediately starts playing the data recorded in file B. After this, as shown in FIG. 4(c), if a data rewind command is received during the delayed playing procedure of the data in file B, the controller 1 moves the playing position PP toward the head address of the data in file B as indicated by the arrow. Once the playing position PP moves up to the head address of the data in file B, since the end address of the data recorded in file A is recorded in file B, the controller 1 reads from file B the end address of the data recorded in file A, moves the playing position PP to the end address of the data in file A (as indicated by the arrow) based on the data rewind command, and further moves the playing position PP toward the head address of the data in file A.

If a data fast-forward command is received during the delayed playing procedure of the data in file A, as shown in FIG. 4(d), the controller 1 moves the playing position PP toward the end address of the data in file A as indicated by the arrow. Once the playing position PP moves to the end address of the data in file A, since the head address of the data in file B of the permanent recording region 9b is recorded in file A, the controller 1 reads from file A the head address of the data in file B, moves the playing position PP to the head address of the data in file B (as indicated by the arrow) based on the fast-forward command, and further moves the playing position PP toward the address where data that is currently inputted is being recorded in file B.

In the above embodiment, the head address of the data in file B is read when the playing position PP is moved up to the end address of the data in file A. However, the timing at which the head address of the data in file B should be read is not limited thereto. Alternatively, the head address of the data in file B may be read, for example, when a fast-forward command is received, or when the playing position PP is being moved toward the end address of the data in file A.

As discussed above, in the present embodiment, when the permanent recording of data in file B of the permanent recording region 9b is started during a time shift operation, the end address of the data in file A of the time shift recording region 9a is recorded in file B, and the head address of the data in file B is recorded in file A. Therefore, the data in file A of the time shift recording region 9a and the data in file B of the permanent recording region 9b can be treated as if they were a single set of data, which prevents the loss of the data in file A, which was recorded prior to the permanent recording in file B. Thus, the playing of the data in file A of the time shift recording region 9a can be continued during the delayed playing procedure even after the permanent recording of data is started in file B of the permanent recording region 9b. Also, both during both the live playing procedure and delayed playing procedure, the playing of the data in file B of the permanent recording region 9b can be started continuously after the end of playing of the data in file A, by using the head address of the data in file B recorded in file A. In other words, the permanent recording of data can be performed while allowing data to be played with a time shift operation. Also, during the data rewinding procedure, the playing position PP can be moved from the data in file B of the permanent recording region 9b to the data in file A of the time shift recording region 9a by using the end address of the data in file A recorded to file B. Further, during the data fast-forward procedure, the playing position PP can be moved from the data in file A of the time shift recording region 9a to the data in file B of the permanent recording region 9b by using the head address of the data in file B recorded in file A.

Furthermore, as discussed above, since the end address of the data temp in file A is recorded in file B, where the permanent recording of data started immediately after the temporary recording in file A, and since the head address of the data that is being permanently recorded in file B is recorded in file A, where the temporary recording of data has been performed until immediately before the permanent recording in file B started, the head address of the data in file B can be read during the playing of the data in file A, and the end address of the data in file A can be read during the playing of the data in file B. Therefore, the playing position PP can be quickly moved between the data in file A and the data in file B.

Additional Procedures

Figure 5:
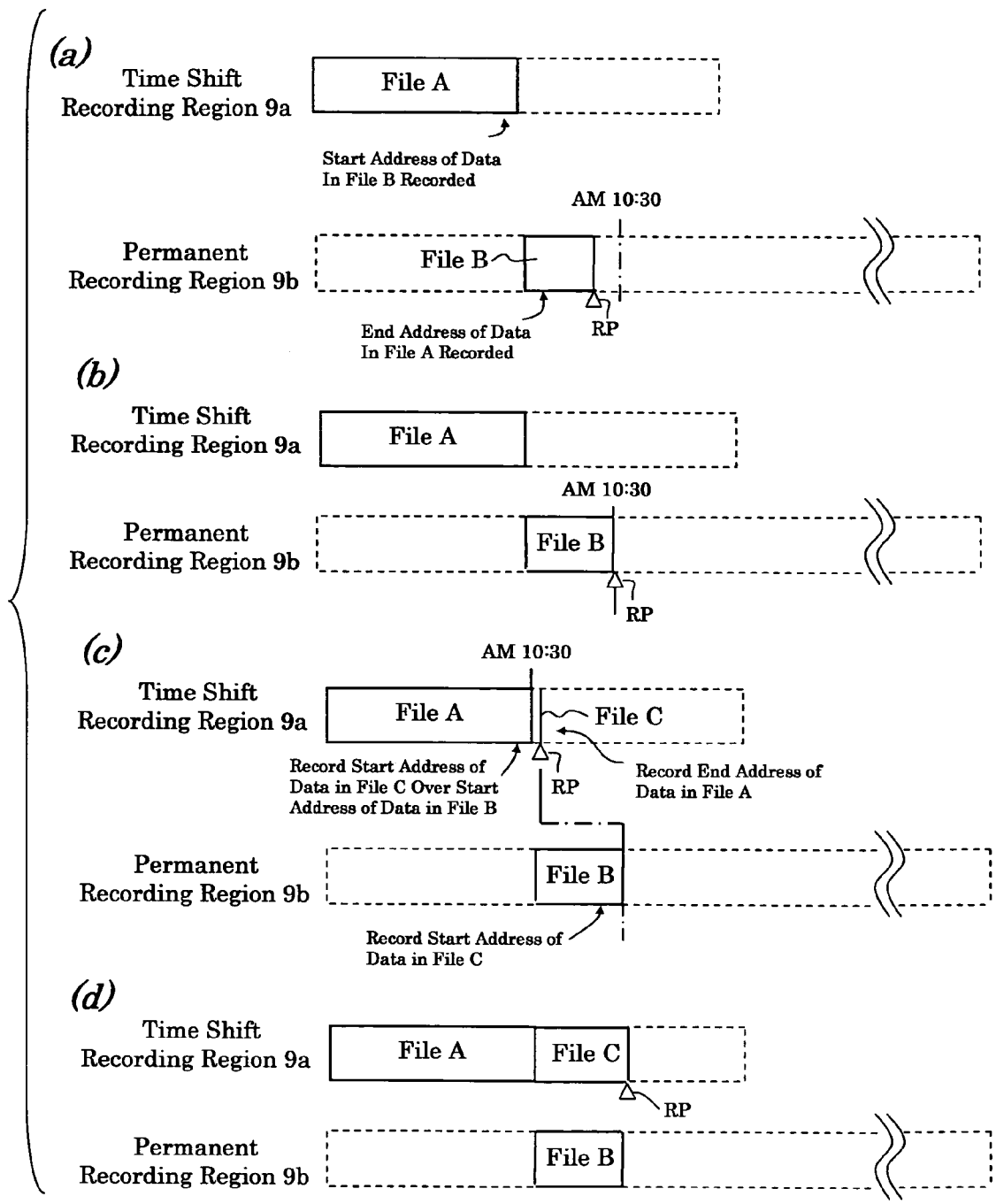
FIG. 5 is a diagram illustrating another data recording procedure of the time shifting operation.
Figure 6:
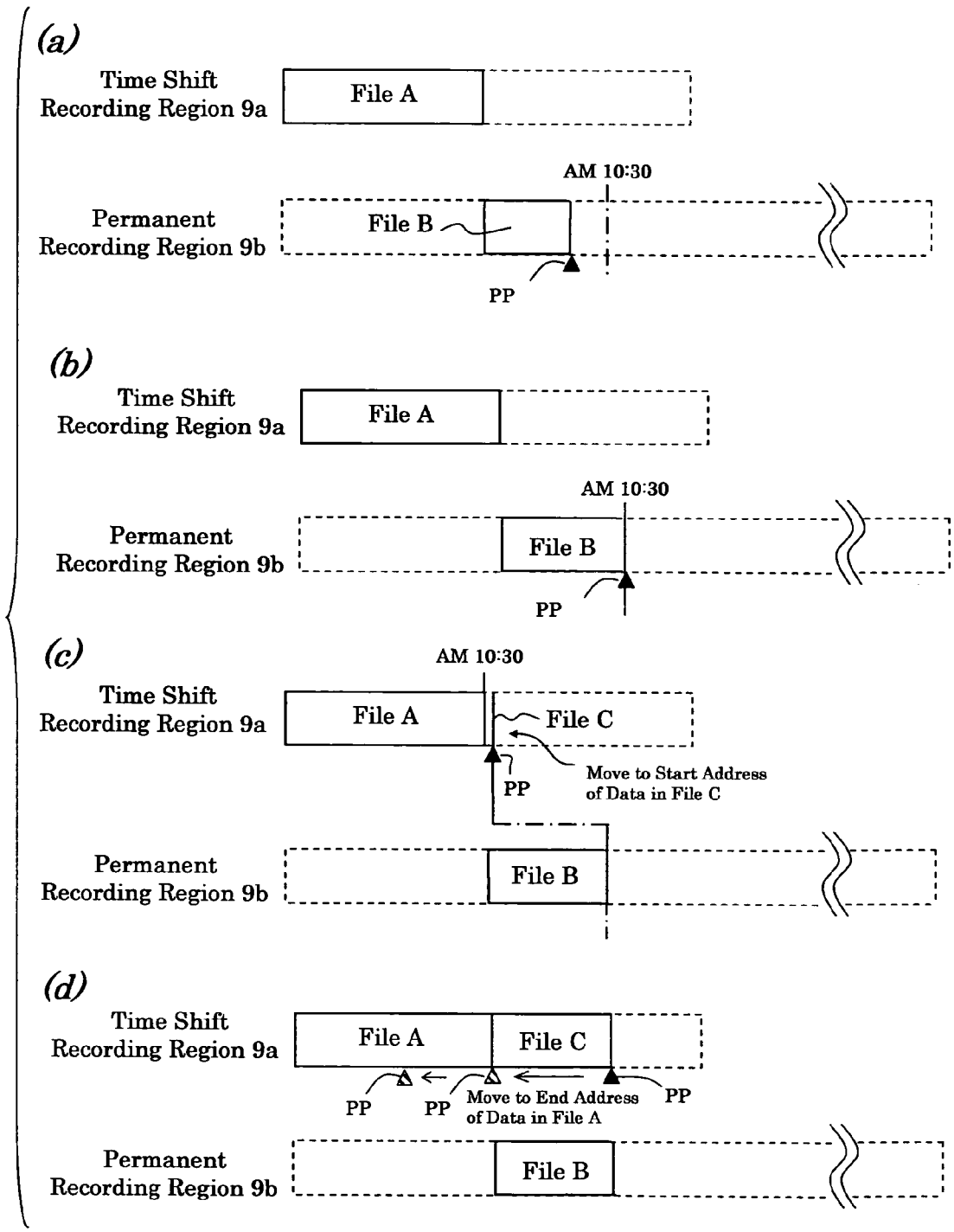
FIG. 6 is a diagram illustrating another live playback procedure of the time shifting operation.
Figure 7:
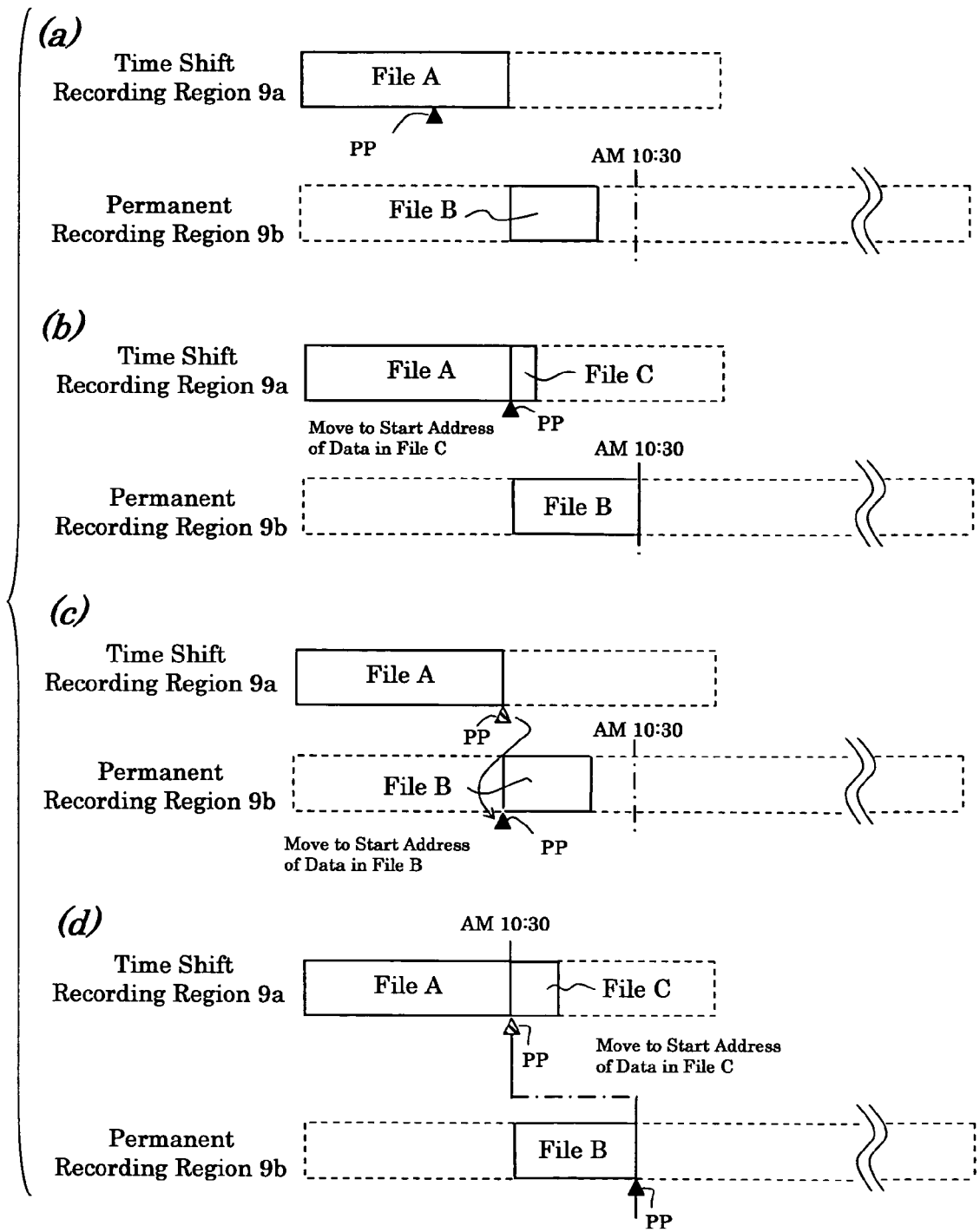
FIG. 7A is a diagram illustrating another delayed playing procedure of the time shifting operation.
FIG. 7B is a diagram illustrating another delayed playing procedure of the time shifting operation.
Figure 7:
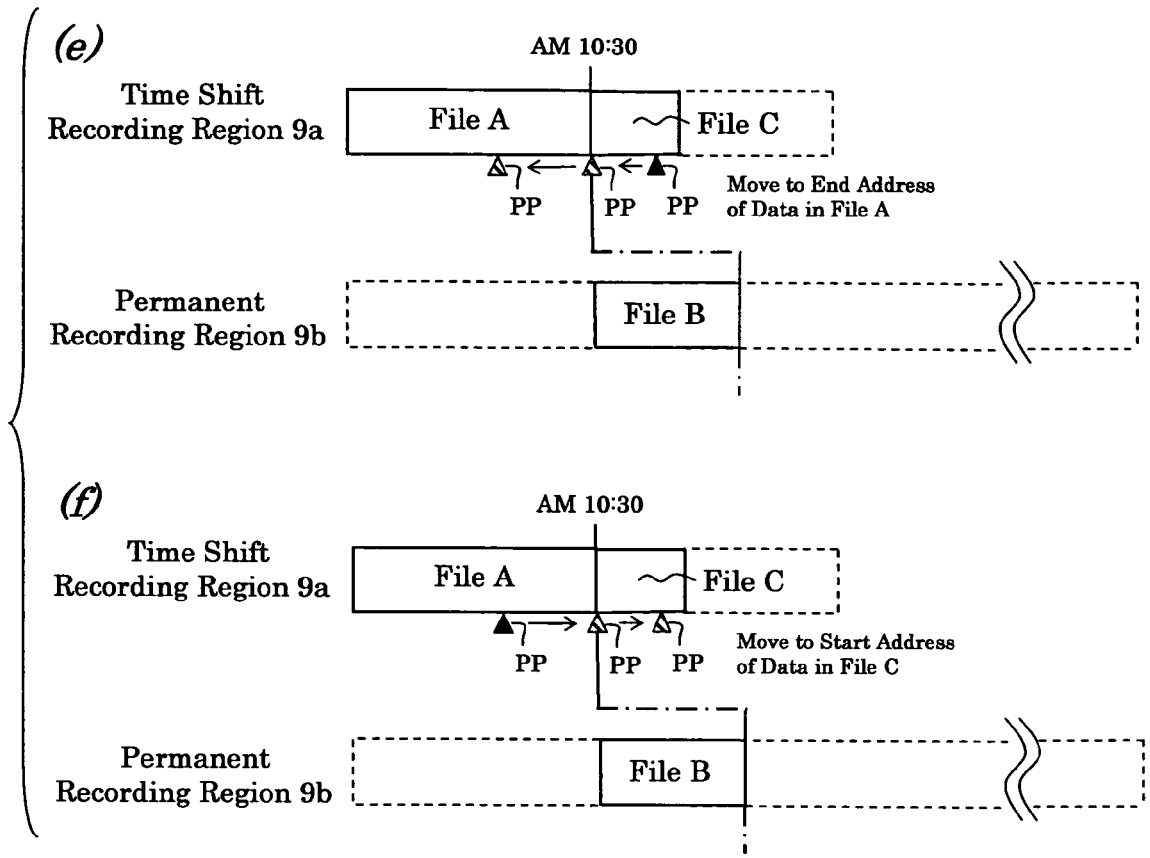

FIGS. 5 to 7 are diagrams illustrating additional operating procedure of the HDD/DVD recorder 10. These various operating procedures are executed after the operations described in FIGS. 2 to 4 are carried out. FIG. 5 shows a data recording procedure of the time shifting operation, FIG. 6 shows a live playing procedure of the time shifting operation, and FIGS. 7A and 7B show a delayed playing procedure of the time shifting operation.

First, in FIG. 5, as discussed above, the controller 1 receives a data recording command at the timer recording start time, stops the temporary recording of data in file A of the time shift recording region 9a, and starts the permanent recording of data in file B of the permanent recording region 9b, such that data is permanently recorded as needed in file B as shown in FIG. 5(a). At this point, the end address of the data being temporarily recorded in file A is recorded in file B, and the head address of the data being permanently recorded in file B is recorded in file A. After this, as shown in FIG. 5(b), when the preset timer recording end time of 10:30 a.m. comes and a data recording stop command is received, the controller 1 stops the permanent recording of data in file B of the permanent recording region 9b. Immediately thereafter, the controller 1 creates a file C (shown in FIG. 5(c)) as a storage region for data to be temporarily recorded, at an address immediately after the end address of file A within the time shift recording region 9a. The controller 1 then moves the recording position RP to this file C, and resumes temporary recording of data therein. As the this temporary recording is resumed, the controller 1 records in file C, where the temporary recording of data has been resumed, the end address of the data that was temporarily recorded in file A. The controller 1 also records in file B, where the permanent recording of data ended, the head address of the data being temporarily recorded in file C. Further, the controller 1 overwrites in file A the head address of the data being temporarily recorded in file C over the head address of the data in file B, which was previously recorded to file A, thereby deleting the head address of the data in file B. After this, the controller 1 records data as needed in file C of the time shift recording region 9a as shown in FIG. 5(d). The data recorded in file A, file B, and file C may be, for instance, the same television program, or may be different television programs. In the above procedures, the head address of the data in file B is invalidated or deleted in this embodiment by overwriting the head address of the data in file B over the head address of the data in file C, but the deletion of the address is not limited to this arrangement. In addition, the head address of the data in file C can be recorded in file A without deleting the head address of the data in file B, with an address with newer recording date/time being validated, and old addresses being invalidated.

Simultaneously with the above recording of data in the time shift recording region 9a or the permanent recording region 9b, the controller 1 starts playing the recorded data. In the live playing procedure of FIG. 6, the controller 1 in FIG. 6(a) plays data that is currently inputted and permanently recorded in file B of the permanent recording region 9b. After this, as shown in FIG. 6(b), when the timer recording end time of 10:30 a.m. comes, as discussed above, the controller 1 starts the temporary recording of data in file C, which has been created in the time shift recording region 9a. The controller 1 also records in file A and file B the head address of the data temporarily recorded in file C, so that the address of the data in file C can be read while data in file B is played, and the playing position PP can be moved to the head address of the data in file C as shown in FIG. 6(c). After this movement, the controller 1 immediately starts playing the data that is currently inputted and recorded in file C. After this, as shown in FIG. 6(d), when a data rewind command is received during the playing of current data that is being recorded in file C, the controller 1 moves the playing position PP toward the head address of the data in file C. Once the playing position PP moves to the head address of the data in file C, since the end address of the data that was temporarily recorded in file A of the time shift recording region 9a is recorded in file C, the controller 1 reads that address from file C, moves the playing position PP to the end address of the data in file A (as indicated by the arrow) based on the rewind command, and further moves the playing position PP toward the head address of the data in file A.

Meanwhile, in the delayed playing procedure of FIGS. 7A and 7B, the controller 1 plays the data that was recorded a predetermined period of time before the current time, out of all the data that has been temporarily recorded in file A of the time shift recording region 9a, as shown in FIG. 7A(a). Simultaneously with this, the controller 1 performs the permanent recording of data in file B of the permanent recording region 9b as discussed above. As shown in FIG. 7A(b), when the playing position PP reaches the end address of the data recorded in file A and the playing of the data in file A is finished, the permanent recording of data in file B has already stopped and data is now being temporarily recorded in file C in this example. Since the head address of the data in file C is written in file A over that of the data in file B, the head address of the data in file B has been deleted. Thus, the controller 1 reads the head address of the data in file C from file A, and moves the playing position PP to the head address of the data in file C. After this movement, the controller 1 immediately starts playing the data recorded in file C.

In regard to the above, as shown in FIG. 7A(c), if data is still being permanently recorded in file B when the playing position PP reached the end address of data recorded in file A and the playing of the data in file A is complete, since the head address of the data in file B is still recorded in file A without being overwritten, the controller 1 reads from file A the head address of the data in file B, and moves the playing position PP to the head address of the data in file B as indicated by the arrow. After this movement, the controller 1 immediately starts playing the data recorded in file B. After this, as shown in FIG. 7A(d), the playing position PP reaches the end address of the data recorded in file B and the playing of the data in file B is completed. At this point, since the temporary recording of data in file C, which has been created in the time shift recording region 9a, has already started and the head address of the data in file C has already been recorded in file B, the controller 1 reads the head address of the data in file C from file B, and moves the playing position PP to the head address of the data in file C. After this movement, the controller 1 immediately starts in the data recorded to file C.

After this, as shown in FIG. 7B(e), when a data rewind command is received during the delayed playing operation of the data in file C, then the controller 1 moves the playing position PP toward the head address of the data in file C as indicated by the arrow. Then, when the playing position PP is moved to the head address of the data in file C, since the end address of the data recorded in file A is recorded in file C, the controller 1 reads from file C the end address of the data in file A, moves the playing position PP to the end address of the data in file A (as indicated by the arrow) based on the data rewind command. Then, the controller 1 further moves the playing position PP toward the head address of the data in file A.

Also, as shown in FIG. 7B(f), when a data fast-forward command is received after the playing position PP is rewound back to the data in file A, the controller 1 moves the playing position PP toward the end address of the data in file A as indicated by the arrow. When the playing position PP reaches the end address of the data in file A, since the head address of the data in file C is rewritten in file A over that of the data in file B, the head address of the data in file B has been invalidated or deleted from file A. Therefore, the controller 1 reads from file A the head address of the data in file C, and moves the playing position PP to the head address of the data in file C (as indicated by the arrow) according to the data fast-forward command. The controller 1 then further moves the playing position PP toward the address at which the data that is currently inputted is being recorded in file C.

As discussed above, after the end of the permanent recording of data in file B of the permanent recording region 9b, which started during the time shift operation, the temporary recording of data in file C of the time shift recording region 9a starts, the end address of the data that has been temporarily recorded in file A is recorded in file C, and the head address of the data being temporarily recorded in file C is recorded in file A over the head address of the data in file B that was previously recorded. Accordingly, the head address of the data in file B is invalidated or deleted from file A in this embodiment. As a result, the data in file C and file A of the time shift recording region 9a, which recorded data before and after the permanent recording, can be treated as a single set of data, preventing the loss of the data in file A that was temporarily recorded prior to the start of permanent recording.

Also, by creating file C at the address immediately after the end address of the data temporarily recorded in file A of the time shift recording region 9a, and by separately recording data in files A and C before and after the permanent recording in file B, it is possible to prevent the data temporarily recorded in file A from being overwritten and deleted by the data temporarily recorded in file C, which is recorded after the permanent recording. Thus, in the delayed playing procedure, the playing of the data in file A can be continued even after the temporary recording of data in file C is started. Furthermore, during the live playing and delayed playing operations, upon completion of the playing the data in file A, the playing of the data in file C can be continuously started by using the head address of the data in file C recorded in file A. Also, during the data rewinding operation, the playing position PP can be moved from the data in file C, which was recorded after the permanent recording, to the data in file A, which was recorded prior to the permanent recording. Further, the during data fast-forward operation, the playing position PP can be moved from the data in file A to the data in file C by using the head address of the data in file C recorded in file A.

Also, as discussed above, since the end address of the data temporarily recorded in file A is recorded in file C, and the head address of the data being temporarily recorded in file C after the permanent recording is recorded in file A, the head address of the data in file C can be read while playing the data in file A, and the end address of the data in file A can be read while playing the data in file C. In this manner, the playing position PP can be quickly moved between file C and file A, in which data is respectively recorded after and before the permanent recording.

Furthermore, as discussed above, the head address of the data being temporarily recorded in file C is recorded in file B, in which data was permanently recorded immediately before the recording in file C. Accordingly, even when the permanent recording of data in file B is stopped and the temporary recording of data in file C is restarted, the playing of data in file B will not be forced to stop during the delayed playing procedure of data in file B. Then, after the playing of data in file B is finished, the playing of the data in file C can be started continuously by using the head address of the data in file C recorded in file B. Further, since the head address of the data in file C can be read while playing the data in file B, the playing position PP can be quickly moved from the data in file B to the data in file C.

Second Embodiment

Figure 8:
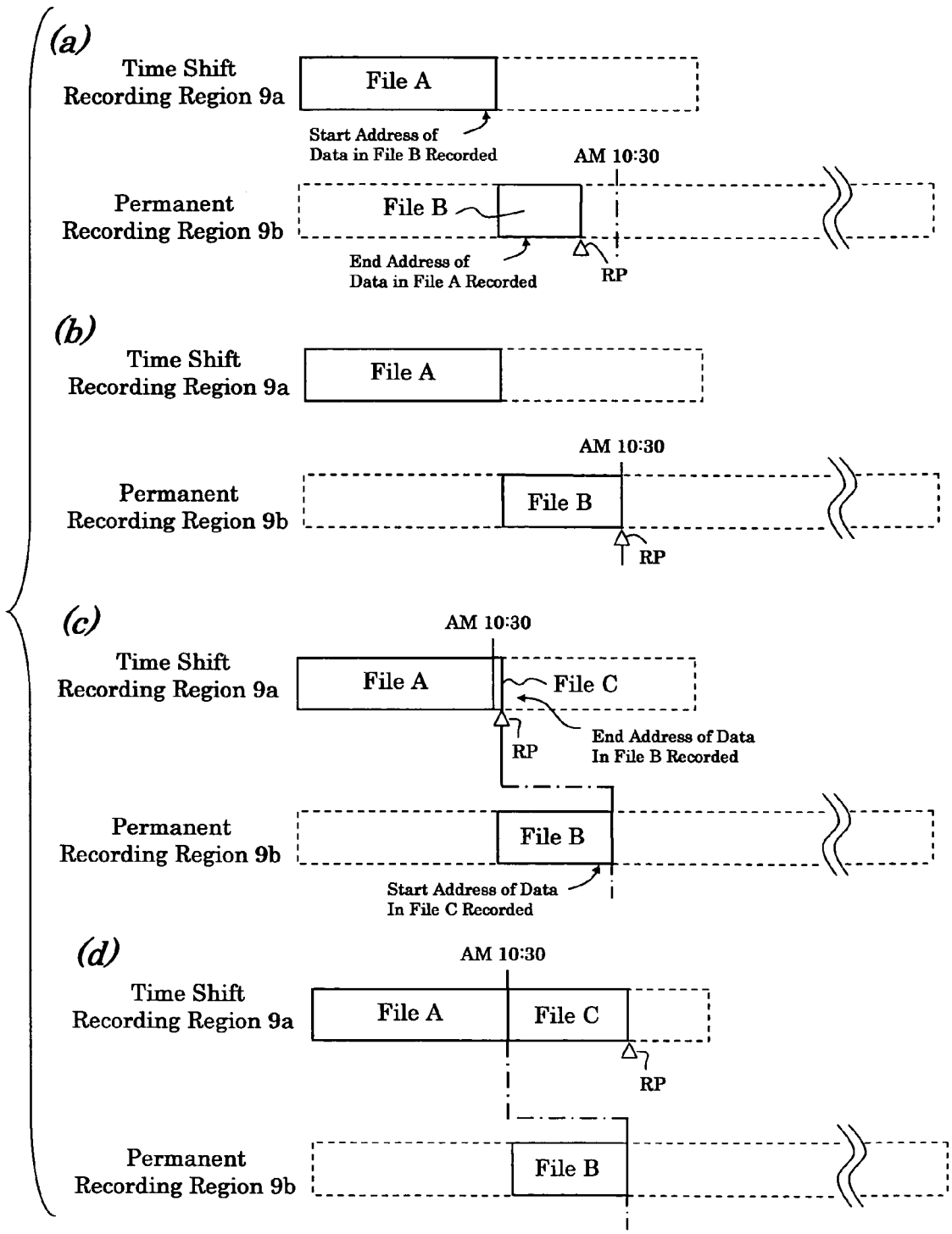
FIG. 8 is a diagram illustrating the data recording procedure of the time shifting operation in accordance with a second embodiment.
Figure 9:
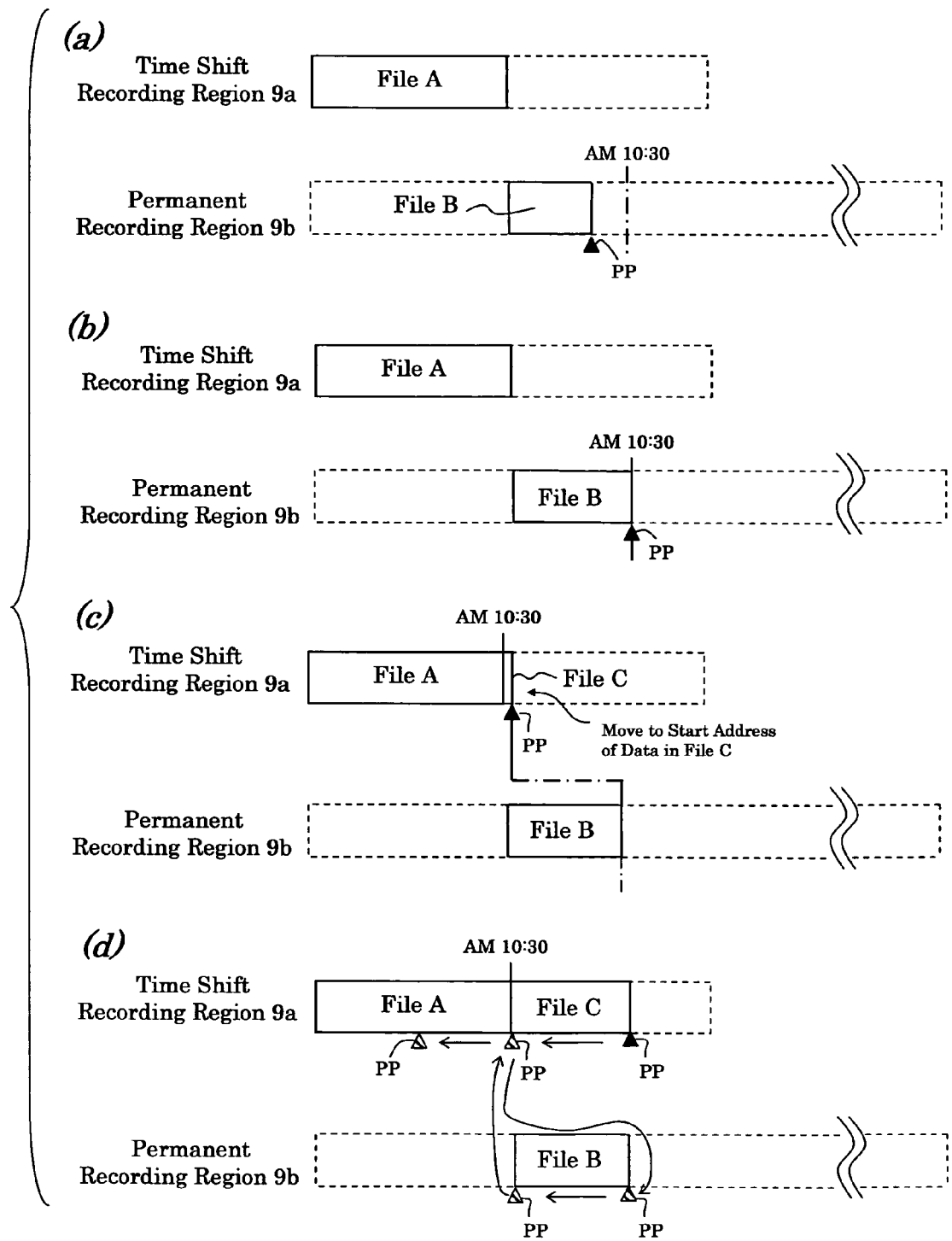
FIG. 9 is a diagram illustrating the live playing procedure of the time shifting operation in accordance with the second embodiment.
Figure 10:
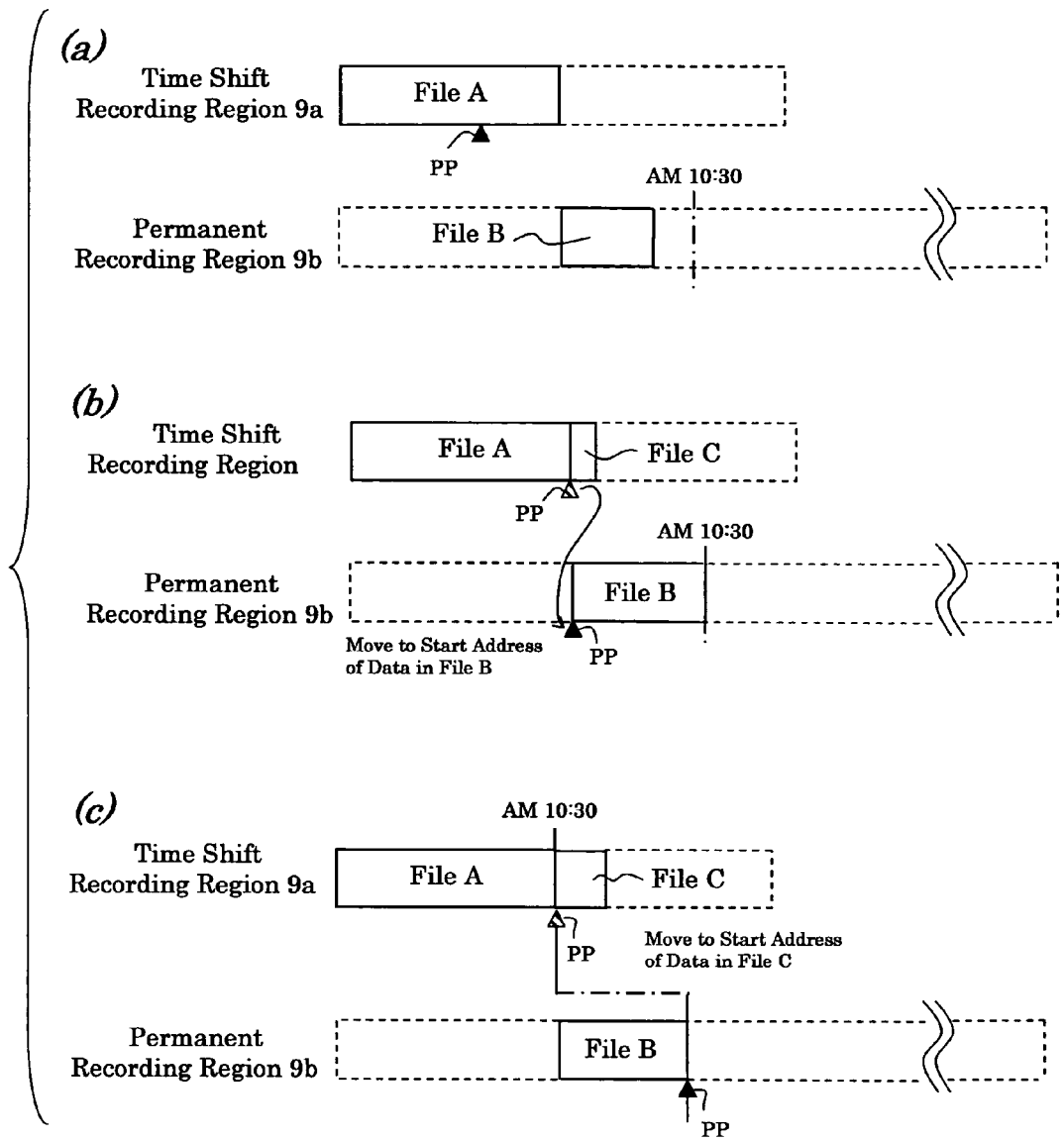
FIG. 10 is a diagram illustrating the delayed playing procedure of the time shifting operation in accordance with the second embodiment.
Figure 10:
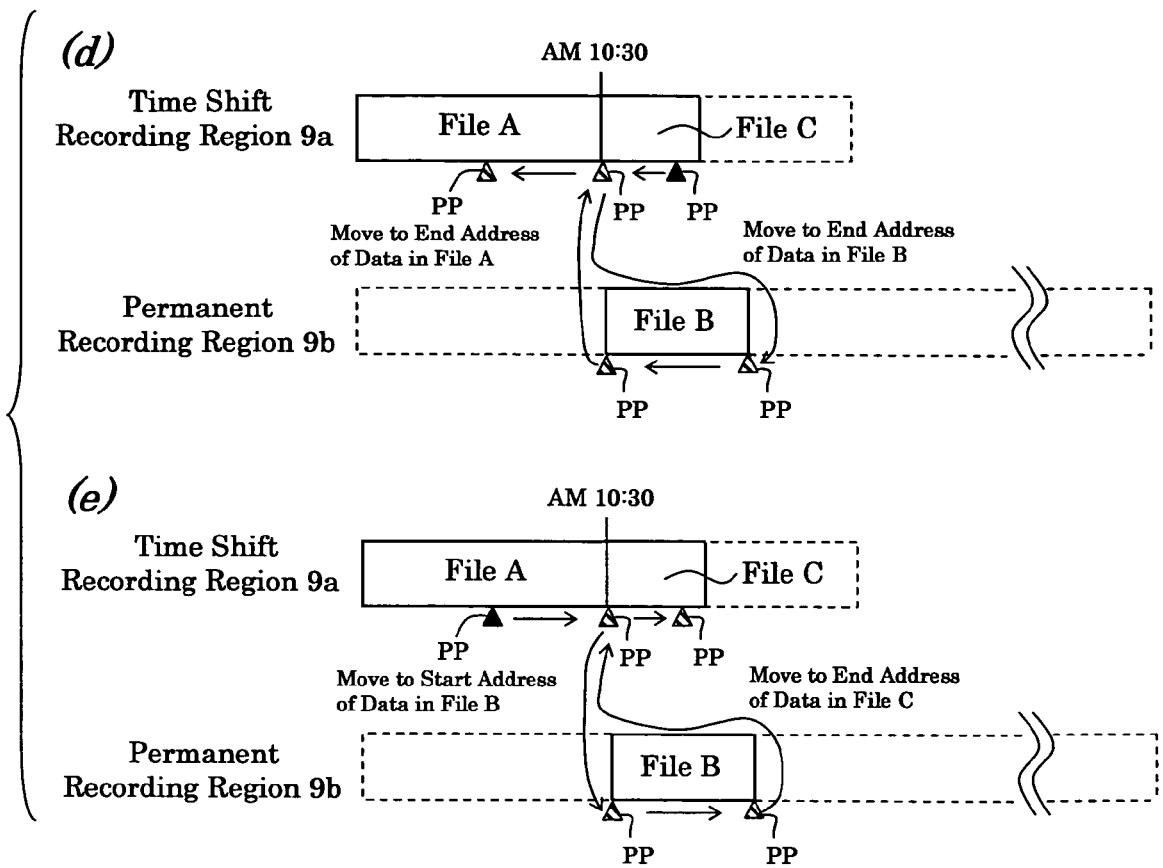

FIGS. 8 to 10 are diagrams illustrating the operating procedure of the HDD/DVD recorder 10 in accordance with another embodiment of the present invention. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The various operating procedures are executed after the operations described in FIGS. 2 to 4 are carried out. FIG. 8 shows the data recording procedure during time shift, FIG. 9 shows the live playing procedure of the time shift operation, and FIG. 10 shows the delayed playing procedure of the time shift operation.

First, in FIG. 8, as discussed above, the controller 1 receives a data recording command at the timer recording start time, stops the temporary recording of data in file A of the time shift recording region 9a, and starts the permanent recording of data in file B of the permanent recording region 9b, after which data is permanently recorded as needed in file B as shown in FIG. 8(a). At this point, the end address of the data temporarily recorded in file A is recorded in file B, and the head address of the data being permanently recorded in file B is recorded in file A. After this, as shown in FIG. 8(b), when the preset timer recording end time of 10:30 a.m. comes and a data recording stop command is received, the controller 1 stops the permanent recording of data in file B of the permanent recording region 9b. Immediately thereafter, the controller 1 creates a file C (as shown in FIG. 8(c)) as a storage region for data to be recorded at an address immediately after the end address of file A of the time shift recording region 9a, moves the recording position RP to this file C, and resumes the temporary recording of data in file C. As the temporary recording is resumed, the controller 1 records in file C the end address of the permanently recorded data in file B. The controller 1 also records in file B the head address of the data being temporarily recorded in file C. After this, the controller 1 records data as needed in file C of the time shift recording region 9a as shown in FIG. 8(d).

Simultaneously with the above recording of data in the time shift recording region 9a and the permanent recording region 9b, the controller 1 plays recorded data. In the live playing procedure of FIG. 9, the controller 1 plays data that is currently inputted and permanently recorded in file B of the permanent recording region 9b, as shown in FIG. 9(a). After this, as shown in FIG. 9(b), when the timer recording end time of 10:30 a.m. comes, as discussed above, the controller 1 starts the temporary recording of data in file C, which has been created in the time shift recording region 9a, and also records in file B the head address of the temporarily recorded data in file C. In this manner, the address of data in file C can be read from file B and the playing position PP can be moved to the head address of the data in file C as shown in FIG. 9(c). After the playing position PP moves to the data in file C, the controller 1 immediately starts playing data that is currently inputted and recorded in file C.

After this, as shown in FIG. 9(*d*), when a data rewind command is received while playing data that is simultaneously recorded in file C, the controller 1 moves the playing position PP toward the head address of the data in file C. Once the playing position PP moves to the head address of the data in file C, since the end address of the data in file B is recorded in file C, the controller 1 reads from file C the address of the data in file B, moves the playing position PP to the end address of the data in file B (as indicated by the arrow) based on the data rewind command, and further moves the playing position PP toward the head address of the data in file B.

After this, if there is still the data rewind command when the playing position PP has moved to the head address of the data in file B, since the end address of the data temporarily recorded in file A is recorded in file B, the controller 1 reads the address of the data in file A from file B, moves the playing position PP to the end address of the data in file A (as indicated by the arrow) according to the data rewind command, and further moves the playing position PP toward the end address of the data in file A.

Meanwhile, in the delayed playing procedure of FIG. 10, the controller 1 plays data that was recorded a predetermined period of time prior to the current time as shown in FIG. 10(*a*), out of all the data that has been temporarily recorded in file A of the time shift recording region 9*a*. Simultaneously with this, the controller 1 performs the permanent recording of data in file B of the permanent recording region 9*b* as discussed above. As shown in FIG. 10(*b*), when the playing position PP reaches the end address of the data recorded in file A and the playing of the data in file A is completed, since the head address of the data in file B is recorded in file A, the controller 1 reads that address from file A, and moves the playing position PP to the head address of the data in file B. After this movement of the playing position PP, the controller 1 immediately starts playing the data recorded in file B. Then, as shown in FIG. 10(*c*), when the playing position PP reaches the end address of the data recorded in file B and the playing of the data in file B is complete, since the head address of the data in file C is recorded in file B, the controller 1 reads from file B the head address of the data in file C, and moves the playing position PP to the head address of the data in file C. After this movement, the controller 1 immediately starts playing the data recorded in file C.

After this, as shown in FIG. 10(*d*), when a data rewind command is received while the data in file C that is recorded a predetermined period of time prior to the current time is being played, the controller 1 moves the playing position PP toward the head address of the data in file C as indicated by the arrow. Then, when the playing position PP is moved to the head address of the data in file C, since the end address of the data recorded in file B is recorded in file C, the controller 1 reads the end address of the data in file B from file C, moves the playing position PP to the end address of the data in file B (as indicated by the arrow) according to the data rewind command, and further moves the playing position PP toward the head address of the data in file B. After this, if there is still the data rewind command after the playing position PP moved to the head address of the data in file B, since the end address of the data temporarily recorded in file A is recorded in file B, the controller 1 reads the end address of the data in file A from file B, moves the playing position PP to the end address of the data in file A (as indicated by the arrow) according to the data rewind command, and further moves the playing position PP toward the head address of the data in file A.

Also, as shown in FIG. 10*e*, when a data fast-forward command is received after the playing position PP is moved to the data in file A, the controller 1 moves the playing position PP toward the end address of the data in file A as indicated by the arrow. When the playing position PP reaches the end address of the data in file A, since the head address of the data in file B is recorded in file A, the controller 1 reads the head address of the data in file B from file A, moves the playing position PP to the head address of the data in file B (as indicated by the arrow) according to the data fast-forward command, and further moves the playing position PP toward the end address of the data in file B. After this, if there is still the data fast-forward command after the playing position PP is moved to the end address of the data in file B, since the head address of the data temporarily recorded in file C is recorded in file B, the controller 1 reads from file B the head address of the data in file C, moves the playing position PP to the head address of the data in file C (as indicated by the arrow) according to the data fast-forward command, and further moves the playing position PP toward the address in file C where current data is being recorded.

As discussed above, after the permanent recording of data in file B of the permanent recording region 9*b* is stopped, the temporary recording of data in file C of the time shift recording region 9*a* is resumed, the end address of the data permanently recorded in file B is recorded in file C, and the head address of the data being temporarily recorded in file C is recorded in file B. As a result, the data in file B of the permanent recording region 9*b* and the data in file C of the time shift recording region 9*a* can be treated as a single set of data. Also, as mentioned above, the data in file A of the time shift recording region 9*a* and the data in file B of the permanent recording region 9*b* can be treated as a single set of data. Therefore, the data in file A, the data in file B, and the data in file C can be treated as a single set of data, which prevents the loss of the data in file A that was temporarily recorded prior to the permanent recording in file B. Thus, during the delayed playing operation, the playing of the data in file A, which was recorded prior to the permanent recording in file B, can be continued even after the temporary recording of data in file C begins. Also, during both live playing and delayed playing operations, upon completion of the playing of the data in file A, the data permanently recorded in file B can be continuously played by using the head address of the data in file B recorded in file A. Furthermore, upon completion of the playing of the data in file B, the playing of the data temporarily recorded in file C can be started continuously by using the head address of file C recorded in file B.

Also, during a data rewind operation, the playing position PP can be moved from the temporarily recorded data in file C to the permanently recorded data in file B and then to the temporarily recorded data in file A, by using the end address of file B recorded in file C and the end address of file A recorded in file B. Further, during a data fast-forward operation, the playing position PP can be moved from the temporarily recorded data in file A to the permanently recorded data in file B and then to the temporarily recorded data in file C, by using the head address of the data in file B recorded in file A and the head address of the data in file C recorded in file B.

Furthermore, as discussed above, the end address of the temporarily recorded data in file A and the head address of the temporarily recorded data in file C are both recorded in file B, the head address of the permanently recorded data in file B is recorded to file A, and the end address of the permanently recorded data in file B is recorded in file C. Accordingly, the head address of the data in file B can be read while the data in file A is played, the end address of the data in file A and the head address of the data in file C can be read while the data in file B is played, and the end address of the data in file B can be read while the data in file C is played. Therefore, playing position PP can be quickly moved between the data in these three files.

In the embodiments described above, the end address and head address of the temporarily recorded data in files A and C of the time shift recording region 9a are recorded in file B of the permanent recording region 9b, while the head address and the end address of the data permanently recorded in file B of the permanent recording region 9b are recorded in files A and C of the time shift recording region 9a. However, the present invention is not limited to this configuration. Instead of recording the end address and the head address in the files, for example, a management region can be created within the hard disk 9 such that files used for data recording can be managed using the management region, and the end address and head address of the files in which data has been recorded can be recorded as needed in this management region.

Also, in the above embodiments, when a data recording command is received, a file B is created in the permanent recording region 9b of the hard disk 9 for the data recording purpose, and data is permanently recorded in this file B. However, the present invention is not limited to this configuration. Instead, for example, a file for data recording can be created in a DVD 20, which is inserted into the HDD/DVD recorder 10, such that data can be permanently recorded in the file in the DVD 20. Nevertheless, it is preferable to permanently record data in a file created in the permanent recording region 9b of the hard disk 9, because when data is temporarily recorded in the time shift recording region 9a of the hard disk 9 and permanently recorded in the permanent recording region 9b, it is possible to read data quickly and play data continuously when the playing position PP moves from the file the in one of the time shift and permanent recording regions to the file in the other of the time shift and permanent recording regions.

Also, in the above embodiments, the permanent recording of data in the permanent recording region 9b is started during the temporary recording of data in the time shift recording region 9a, and the temporary recording of data in the time shift recording region 9a is resumed during the permanent recording of data in the permanent recording region 9b. However, the present invention is not limited to such configurations. Instead, for example, the permanent recording of data in the permanent recording region 9b can be started after the temporary recording of data in the time shift recording region 9a is resumed, or the temporary recording of data in the time shift recording region 9a can be resumed again during the permanent recording of data in the permanent recording region 9b.

Furthermore, in the above embodiments, the present invention is applied to the HDD/DVD recorder 10, which records and plays data in and from the hard disk 9 and the DVD 20. However, the present invention can also be applied to other video recording and playing apparatuses such as a hard disk recorder that records and plays only data in a hard disk, or a hard disk recorder that records and plays data in a hard disk or a removable disk such as a DVD.

With the present invention, temporarily recorded data that is temporarily recorded in a first recording region and permanently recorded data that is permanently recorded in a second recording region can be treated as a single set of data, thereby preventing the loss of the temporarily recorded data that is recorded prior to the permanent recording. In this way, it is possible to perform the permanent recording of data while allowing the recorded data to be played during the recording.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-397425. The entire disclosure of Japanese Patent Application No. 2003-397425 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A video recording and playing apparatus that records and plays video image data inputted from an external source, comprising:

an input portion configured to receive data being inputted;

a recording medium having a first recording region, in which the inputted data is configured to be at least partially recorded;

a command receiving portion configured to receive a data recording command; and a controller being operatively coupled to the input portion, the recording medium, and the command receiving portion and configured to perform a time shift function, by which the inputted data is recorded in a first file created in the first recording region while allowing the controller to play any portion of the data recorded in the first recording region, when the command receiving portion receives the data recording command, the controller being configured to stop recording data in the first file, record the inputted data in a second file created in a second recording region, and record in the recording medium an end address of the first file and a head address of the second file, the controller being further configured to play the data recorded in the first file and the second file continuously by using the end address of the first file and the head address of the second file.

2. The video recording and playing apparatus according to claim 1, wherein the command receiving portion is configured to receive a data recording stop command; and when the controller stops recording data in the second file upon receipt of the data recording stop command by the command receiving portion while performing the time shift function, the controller is configured to start recording data in a third file created in the first recording region at an address immediately after the end address of the first file, record in the recording medium a head address of the third file, invalidate the head address of the second file, and play the data recorded in the first file and the third file continuously by using the end address of the first file and the head address of the third file.

3. The video recording and playing apparatus according to claim 2, wherein the controller records the end address of the first file in the second file and the head address of the second file in the first file when the controller starts recording data in the second file while performing the time shift function, and the controller records the end address of the first file in the third file and the head address of the third file in the first file and invalidates the head address of the second file when the controller stops recording data in the second file and starts recording data in the third file.

4. The video recording and playing apparatus according to claim 3, wherein the controller records the head address of the third file in the second file when the controller stops recording data in the second file and starts recording data in the third file, and the controller plays data in the second file and the third file continuously if the head address of the third file is recorded in both the first and second files.

5. The video recording and playing apparatus according to claim 1, wherein the command receiving portion is configured to receive a data recording stop command and when the controller stops recording data in the second file upon receipt of the data recording stop command by the command receiving portion while performing the time shift function, the controller is configured to start recording data in a third file created in the first recording region at an address immediately after the end address of the first file, record in the recording medium a head address of the third file and the end address of the second file, and play the data recorded in the first, second, and the third files continuously by using the end address of the first file, the head address of the second file, the end address of the second file, and the head address of the third file.

6. The video recording and playing apparatus according to claim 5, wherein the controller records the end address of the first file in the second file and the head address of the second file in the first file when the controller starts recording data in the second file while performing the time shift function, and the controller records the end address of the second file in the third file and the head address of the third file in the second file when the controller stops recording data in the second file and starts recording data in the third file.

7. The video recording and playing apparatus according to claim 1, wherein the recording medium has the second recording region.

8. The video recording and playing apparatus according to claim 1, further comprising a disk reader/writer operatively coupled to the controller to read and write data from and in a removable disk, the removable disk having the second recording region.

9. A video recording and playing apparatus that records and plays broadcasted video image data inputted from an external source, comprising:

an input portion configured to receive data being inputted;

a hard disk having a time shift recording region, in which the inputted data is configured to be at least partially recorded;

a command receiving portion configured to receive a data recording command or a data recording stop command; and a controller being operatively coupled to the input portion, the hard disk, and the command receiving portion and configured to perform a time shift function, the controller having time shift means for recording the inputted data in a first file created in the time shift recording region while allowing the controller to play any portion of the data recorded in the time shift recording region, record control means for stopping recording data in the first file, recording the inputted data in a second file created in a second recording region, and recording an end address of the first file in the second file and a head address of the second file in the first file when the command receiving portion receives the data recording command, and play control means for playing the data recorded in the first file and the second file continuously by using the end address of the first file and the head address of the second file, when the record control means stops recording data in the second file upon receipt of the data recording stop command while the time shift means is activated, the record control means starts recording data in a third file created in the time shift recording region at an address immediately after the end address of the first file, records the end address of the first file in the third file and a head address of the third file in the first and second files, invalidates the head address of the second file, and the control play means plays the data recorded in the first file and the third file continuously by using the end address of the first file and the head address of the third file.

10. A video recording and playing apparatus that records and plays broadcasted video image data inputted from an external source, comprising:

an input portion configured to receive data being inputted;

a hard disk having a time shift recording region, in which the inputted data is configured to be at least partially recorded;

a command receiving portion configured to receive a data recording command or a data recording stop command; and a controller being operatively coupled to the input portion, the hard disk, and the command receiving portion the controller having time shift means for recording the inputted data in a first file created in the time shift recording region while allowing the controller to play any portion of the data recorded in the time shift recording region, record control means for stopping recording data in the first file, recording the inputted data in a second file created in a second recording region, and recording an end address of the first file in the second file and a head address of the second file in the first file when the command receiving portion receives the data recording command, play control means for playing the data recorded in the first file and the second file continuously by using the end address of the first file and the head address of the second file, when the record control means stops recording data in the second file upon receipt of the data recording stop command while the time shift means is activated, the record control means starts recording data in a third file created in the time shift recording region at an address immediately after the end address of the first file, records an end address of the second file in the third file and a head address of the third file in the second file, and the play control means plays the data recorded in the first, second, and the third file continuously by using the end address of the first file, the head address of the second file, the end address of the second file, and the head address of the third file.

* * * * *